United States Patent [19]
Loebner

[11] Patent Number: 6,019,393
[45] Date of Patent: Feb. 1, 2000

[54] PLANAR MEANS FOR INDICATING A GRATUITY AS A FUNCTION

[76] Inventor: Hugh Gene Loebner, c/o Crown Industries Inc. 155 N. Park St., East Orange, N.J. 07017

[21] Appl. No.: 08/103,221

[22] Filed: Aug. 9, 1993

Related U.S. Application Data

[63] Continuation-in-part of application No. 08/074,581, Jun. 11, 1993.

[51] Int. Cl.[7] .............................. B42D 15/00; G06F 17/60
[52] U.S. Cl. ............................................. 283/60.2; 705/15
[58] Field of Search .................................... 364/401, 406, 364/408; 283/60.1, 60.2; 340/706

[56] References Cited

U.S. PATENT DOCUMENTS

| | | |
|---|---|---|
| 1,330,368 | 2/1920 | Boos ...................................... 283/60.1 |
| 1,358,230 | 11/1920 | Miller ..................................... 283/60.1 |
| 2,114,806 | 4/1938 | Massafra ................................. 283/60.1 |
| 4,642,459 | 2/1987 | Caswell et al. .......................... 250/227 |
| 4,723,794 | 2/1988 | Shannon ................................. 283/60.1 |
| 4,949,079 | 8/1990 | Loebner ................................. 340/706 |
| 5,018,066 | 5/1991 | Yagi ....................................... 364/405 |
| 5,127,880 | 7/1992 | Bar et al. ............................... 283/60.2 |
| 5,159,322 | 10/1992 | Loebner ................................. 340/706 |
| 5,241,303 | 8/1993 | Register et al. ........................ 340/706 |

OTHER PUBLICATIONS

"Thrift Savings Plan" Election Form.
Love; "International Verifact Inc. Introduces Portable Hand–held EFT/POS Terminal"; Business Wire (San Francisco, CA, US) s1 p. 2; Jun. 3, 1993; Dialog: File 635, Acc# 0401391.

*Primary Examiner*—Stephen R. Tkacs

[57] ABSTRACT

Optional gratuities in the food and beverage industry may be defined on a planar surface as a percentage function of the cost of meals instead of an absolute dollar amount. This eliminates the necesity of the customer having to perform arithmetic calculations.

12 Claims, 7 Drawing Sheets

Figure 1

Restaurant Name

*For Your Convenience, Allow Us To Calculate the Dollar Amount of the Gratuity!*
*(Of Course, You Always Have The Option Of Entering The Amount On Your Charge Slip Yourself)*

Please Add _____ % As the Gratuity

- Or -

☐ Service was exemplary, please add 20% as the gratuity

☐ Service was satisfactory, please add 15% as the gratuity

☐ Service was dissapointing, please add 12% as the gratuity

☐ Please Round The Up To The Next Whole Dollar

☐ Include Taxes In Calculating Gratituity (if not checked, taxes will be excluded)

_______________
Signature

Figure 2

| Server | Table | Date | Check 012345 |
|---|---|---|---|
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| | | | |
| May We Calculate Your Tip? Add ___ % ☐ Incl Taxes ☐ Round Up | | Food | |
| | | Beverage | |
| | | Subtotal | |
| | | Tax | |
| | | Total | |

| Server | Table | Date | Check 012345 | |
|---|---|---|---|---|
| Qty | Item | | Price | Total |
| | | | | |
| | | | | |

| | |
|---|---|
| Food | |
| Tip % (Excl Tax) % | Beverage |
| | Meal Total |
| Tip $ $ | Tax |
| | Subtotal |
| | Tip |
| | Total |

Signature

PLANAR MEANS FOR INDICATING A GRATUITY AS A FUNCTION

This application is a Continuation in Part of Appl. Ser. No. 08/074,581 filed Jun. 11, 1993, now pending.

BACKGROUND OF THE INVENTION

This invention relates to the method of doing business commonly known as "tipping." This practice is most common in food and beverage establishments. In this practice, a customer pays a monetary gratuity or tip to service personnel in addition to the monetary payment owed the establishment for food and beverages ordered. It is a practice of great antiquity. It should be understood that the amount owed to the establishment by an individual, and the desired amount of the tip, usually represent the charges incurred by more than one person or "cover" in a party.

In some food and beverage establishments more than one tip from a customer may be appropriate depending on the class of the restaurant and the number and types of staff personnel attending the dinner party. It may be appropriate, say, for the customer to leave one tip for the captain, another for the waiter, and yet a third for the somnmelier.

In one method of tipping the amount of the tip is not the customer's option. A particular restaurant may have a policy that for parties in excess, say, of eight people, a, say, 15% gratuity will be automatically added to the bill. Private clubs may automatically add a fixed percentage to each bill as a "service charge."

More frequently, the value of the tip to be left by the customer is optional. The amount of the tip is customarily calculated, by the customer, as a percentage function of the service establishment's bill. The customer solves the function to calculate the tip as an absolute monetary value.

When the customer pays for the meal by cash, the tip, in the form of cash, is left on the table. Customers do not always pay by cash. In many cases, the cost of the meal is charged against an account.

There are a variety of business methods by which the customer can charge his bills. In this disclosure, of course, the term "charge" as used throughout refers to the creation of a monetary debt, and not to an electric charge. If the customer is a known and trusted patron of the establishment he or she may be permitted to "run a tab." Here, an account is created to represent the customer's obligations and maintains a running total of the customer's charges for repayment by the customer at a later time. This is the customary business method used by membership associations such as private clubs.

Those skilled in the art understand that there is a more common charge method. This method involves a financial third party. The third party establishes a credit relationship with an individual by opening an account for the individual. The third party provides the individual with an individualized token, widely known as a credit card, as means for indicating the credit relationship.

Those skilled in the art will realize that although I use the term "credit card" for the individualized token issued, different types of credit relationships exist between the card issuer and the individual. The most common relationship is a revolving credit plan. It is also possible that the issuing agency requires payment in full upon issue of a periodic statement. Yet another possibility is to encumber the individual's account with pre-paid credits and later subtract charges. The particular financial nature of the relationship between the card issuer and the card holder is not important to this disclosure. Also, those skilled in the art will realize that although I use the term "individual" here, credit cards may be issued to organizations such as corporations for use by authorized individuals. It is possible for an establishment which maintains an account for a customer to issue its own credit card.

When a customer charges his meal using a charge card the customer signs a charge record and indicates the amount of the optional tip by writing the amount of the tip as an absolute monetary value. The customer then adds the tip to the charge subtotal to calculate the total amount to be charged. For those customers who determine the value of a tip as a function of the cost of a meal, this requires that the customer perform the calculation necessary to solve the function and add calculated amount to the cost of the meal to arrive at the total cost. Many customers find the calculations involved difficult and onerous.

SUMMARY OF THE PRESENT INVENTION

My invention comprises a planar surface having defined conventional indication means thereon for specifying a gratuity as a percentage function. The defined conventional indication means is produced on the planar surface by a stylus. The stylus comprises means for recording the position of the stylus upon, or in close proximity to, the planar surface.

The preferred embodiment of the invention comprises a sheet of paper or thin cardboard, the paper having (1) a first set of conventional indicators displayed thereon defining (2) a second set of conventional indicators for specifying the gratuity as a function, wherein at least one element of the second set of conventional indicator is produced by (3) a pen and ink.

The use of this invention permits a customer to specify to a restaurant, a waiter, and, optionally, a financial third party, the amount of the waiter's gratuity as a percentage function instead of a monetary value, thereby eliminating the necessity of the customer having to perform arithmetic calculations.

These and other advantages of the present invention will become apparent with reference to the drawings, the detailed description of the preferred embodiments, and my claims.

DESCRIPTION OF THE DRAWINGS

FIG. 6 shows the Main Menu Display for the program.

FIG. 7 is also the image of the screen display of a pen computer under the control of a program to operate the pen computer to capture food and beverage orders. FIG. 7 shows the "Poultry Items" Sub-Menu Display for the program.

DESCRIPTION OF THE PREFERRED EMBODIMENT

Figure 1:
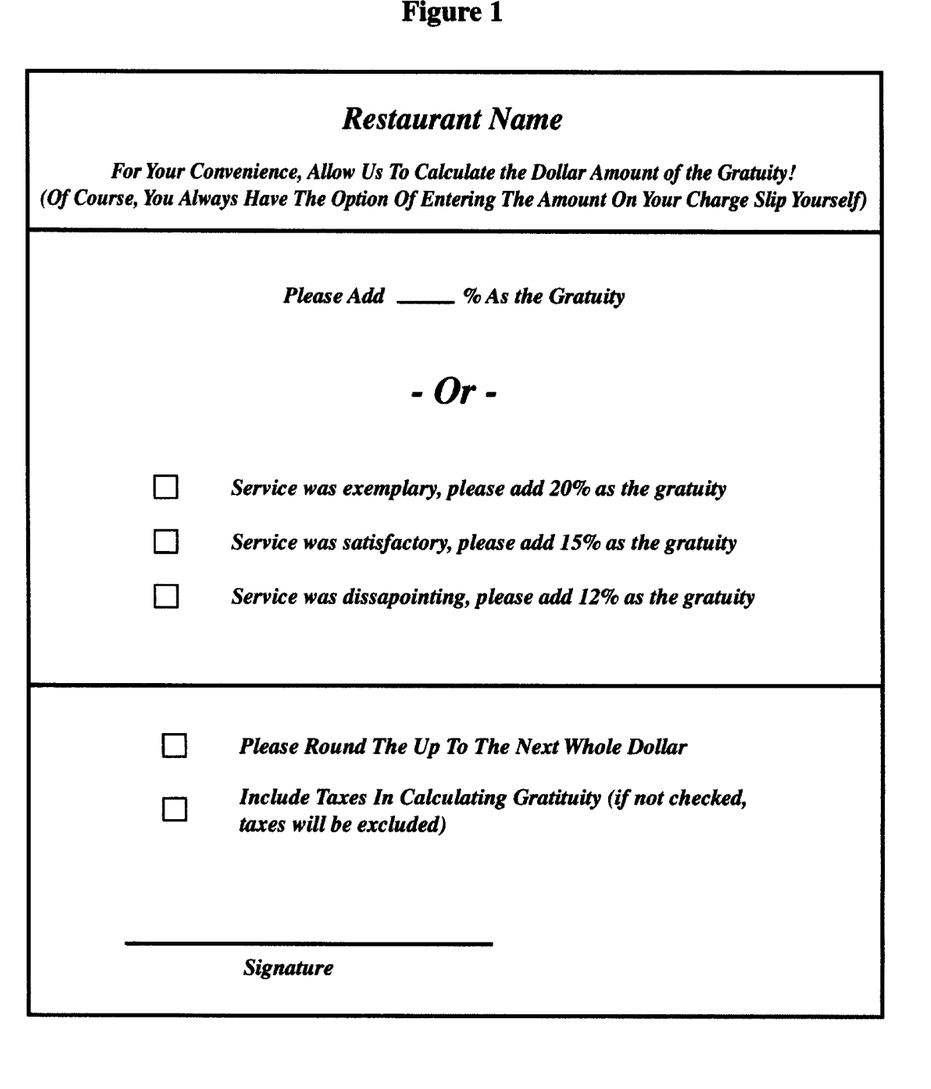
FIG. 1 is the preferred embodiment of the invention comprising a planar surface comprising a first set of conventional indicators printed thereon defining a second set of conventional indicators for specifying the gratuity for a meal as a function of the cost of the meal.

FIG. 1 shows the preferred embodiment of my invention. The invention can be termed a "gratuity sheet". The gratuity sheet comprises a sheet planar material such as paper or thin cardboard. Printed upon the gratuity sheet is a first set of conventional indicators. This set of conventional indicators defines a second set of conventional indicator means to specify the gratuity as a percentage function of the cost of the meal.

Inspection of FIG. 1 shows that the gratuity sheet contains a brief explanation of its use. Also printed on the sheet is a space for a customer to write in the gratuity as a percentage of the cost of the meal or, alternatively, to mark one of several boxes indicating a percentage desired. Associated with the box alternative means of indicating the gratuity are preprinted comment means for the customer to indicate the perceived quality of the service. Finally, printed conventional indicators define means to allow the options of having the tip rounded up to the next highest dollar and to have the percentage calculated on a base figure which includes relevant sales taxes. This is a percentage function rather than a simple percentage because of the options available in calculating the value of the tip.

Those skilled in the arts of paper production and forms design will understand that the surface of the paper is of a nature to absorb ink released by a pen upon the paper. The art of writing on paper is ancient and well understood. The customer uses pen and ink to create, by means of writing, at least one element of the defined second set of conventional indicators. For example, if a customer wishes to leave a 15% tip, he or she can mark the box so indicated. The existence of a mark located at that position on the sheet of paper is defined by the printing to specify a 15% tip.

Figure 2:
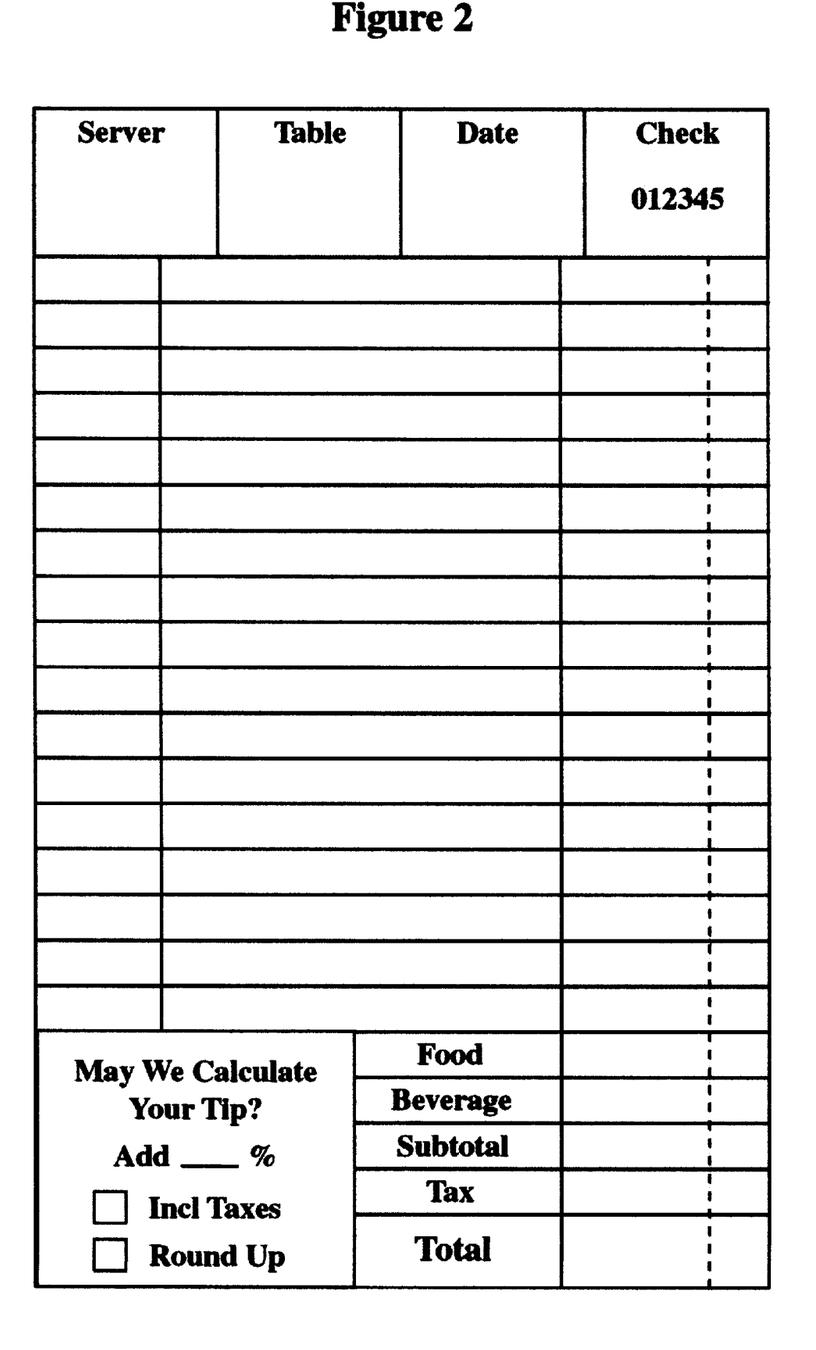
FIG. 2 shows an alternative embodiment being a meal check combined with a first set of conventional indicators printed thereon serving to define a second set of conventional indicators for specifying a gratuity as a function.

The use of the gratuity sheet is simple. At the end of a meal, the server presents to the customer both the gratuity sheet and the usual check for the meal showing the food and beverages ordered and their cost. The customer, if he or she desires to charge the meal and wishes the service establishment to calculate the gratuity, uses a pen to record, on the gratuity sheet, the amount of the tip as a percentage function of the meal total. The customer hands the server his charge card and the gratuity sheet. The server takes both to the cashier. The cashier validates the charge card, calculates the tip based on information on the gratuity sheet, and fills in the charge slip with the appropriate values. The server then returns to the customer with the customer's charge card and the charge slip. The customer signs the charge slip, takes his or her FIG. 2 shows an alternative embodiment of the invention. Here, the dinner check and the gratuity sheet are combined on a single form. When the server presents the check to the customer, the gratuity sheet indicating means are contained thereon. The method of use of this alternative is similar to that of the embodiment described in FIG. 1. The advantage of the combined embodiment shown in FIG. 2 is that only one form is necessary. For these restaurants using computerized cash registers with specific check forms, the computer programs may prevent the use of the combined form as shown in FIG. 2.

Figure 3:
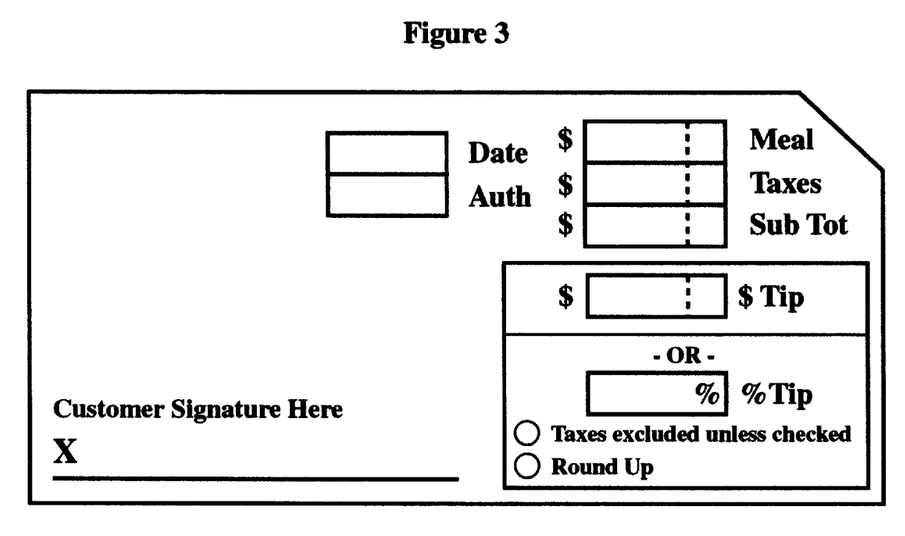
FIG. 3 shows an alternative embodiment being a charge card slip having a first set of conventional indicator means printed thereon to define a second set of indicator means to record the gratuity as a percentage function.

FIG. 3 shows another embodiment comprising a credit card slip having conventional indicator means for recording the gratuity as a percentage function. Those skilled in the art will understand the use of this credit card slip. Upon presentation of the credit card slip, the customer can specify the tip either by writing in an absolute dollar amount in the indicated area or by specifying the percentage function by writing in the requested percent in the indicated area. The credit card slip shown in FIG. 3 does not contain a grand total charge. Those skilled in the art will understand that indicating the grand total is redundant. The monetary values written in boxes the meal and tax amounts, taken together with the tip will result in an unambiguous that will be charged to the customer and credited to the restaurant and and the server.

For instance, if the prevailing tax rate is 5%, the cost of a meal is $100.00 and the desired tip is 15%, then the box marked "Meal" will contain the value "100.00," the box marked "Taxes" will contain the value "5.00,", the box marked "Subtot" will contain the value "105.00" (each having been written by the server) and the box marked "% Tip" will have the value "15," written by the customer to indicate the desired 15% gratuity. The understood value of the tip is $15.00 (i.e. 15% of $100.00) and the grand total can unambiguously be calculated as $120.00.

If, in the above example, there is a mark in the space labeled "Taxes excluded unless checked" the gratuity would be 15% of the meal and taxes, or $105, giving a tip of $15.75 for a Grand Total of $125.75. Finally, those skilled in the art will understand that if the space labeled "Round Up" is also checked, the gratuity of $15.75 will be rounded up to $16.00, and the total charge for the meal would be $121.00.

Recording an optional gratuity as a percentage function rather than as an absolute monetary value is also possible when the planar surface comprises a pen computer. I use the term "pen computer" to refer to the class of portable digital computers having: (1) a planar surface defining a coextensive information receiving surface and information display surface and (2) stylus recording means for recording information on said planar information receiving surface. I use the term stylus to include all slender, essentially cylindrical indicator means, including, among others, fingers. When one end of the stylus is brought close to, or in contact with, the screen display/detection surface, the x, y position of the stylus is digitally recorded. The exact nature by which the proximity of the stylus and its x, y coordinate are detected is not relevant to this disclosure. Many techniques are well known in the art including capacitance sensing, resistance sensing, and optical detection. Furthermore, those skilled in the art of programming pen computers will understand that such computers generally have, as part of the operating system provided by the manufacturer, or available by purchase from third party providers, computer program component means for handwriting recognition.

Figure 4:
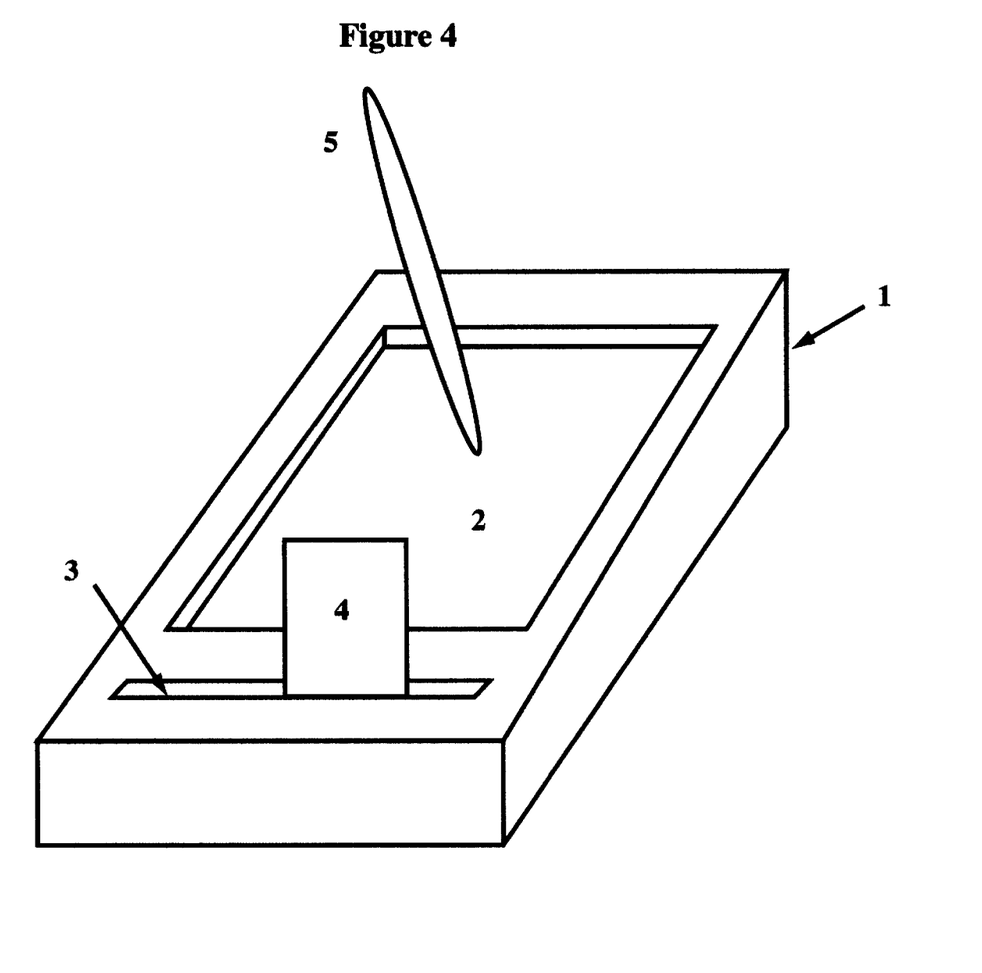
FIG. 4 is a perspective view of a pen computer suitable for performing charging operations comprising a stylus position sensitive computer screen, a stylus, a charge card reader mechanism, and a charge card.

FIG. 4 shows a pen computer 1 with planar display/detection area 2 also comprising a charge card reader means slot 3. Charge card 4 is shown in reader slot 3. Also shown in FIG. 4 is stylus 5, the end of which is in proximity with display/detection screen 2.

Figure 5:
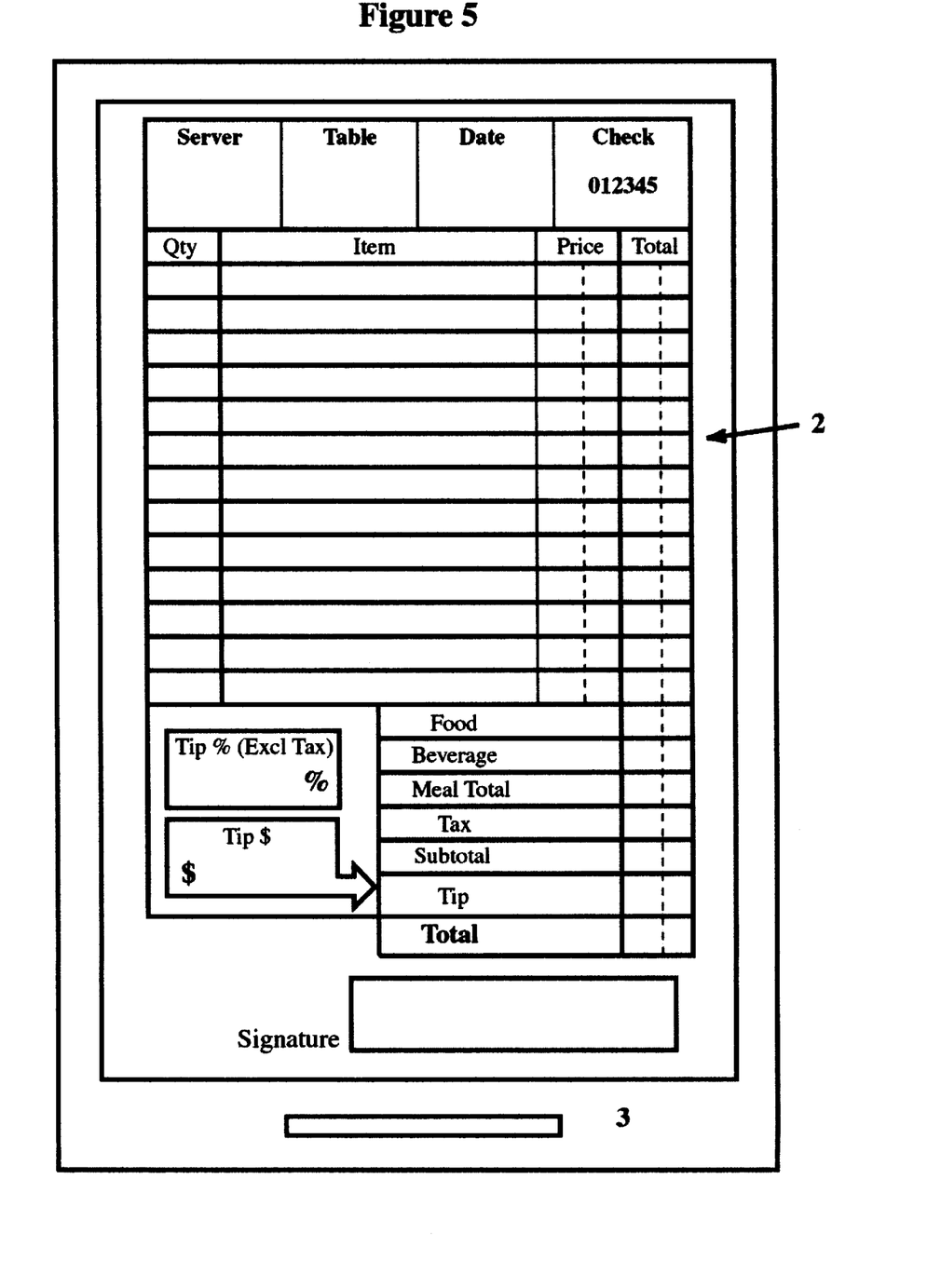
FIG. 5 is the image of the screen display of a pen computer under the operation of a program for charging a meal providing means for imputing an optional gratuity as a percentage function.

FIG. 5 shows the display on pen computer screen 2 while pen computer 1 is under control of internally stored computer instruction means for charging the cost of a meal and gratuities to a customer's account. The computer instruction means includes means for recording and displaying the value of the gratuity as a percentage function and as an absolute dollar amount.

When the desired gratuity is entered by writing a percentage in the Percentage_Tip_Entry area, the monetary value is calculated and displayed in the Dollar_Tip_Entry and Tip areas. When the desired gratuity is entered by writing a monetary amount in the Dollar_Tip_Entry area that amount is displayed in the Tip area and the percentage value is calculated and displayed in the Percentage_Tip_Entry area. After the amount of the tip has been manually entered and the calculations performed automatically, inserting a credit card into card reader 3 signals that the transaction is to be completed.

The program can be described most comprehensibly by the following program specification:

I. Initialize Phase
  (1) Initialize Server, Table, Date and Check_Number.
  (2) Initialize Line_Item_Rows with text and numeric information of items ordered, quantities, prices and extended totals.

These items and values may be entered manually line by line by the waiter using a stylus. However those skilled in the art will understand that a pen computer can profitably be used also to enter meal selection data under control of an "Order Entry Program."

Figure 6:
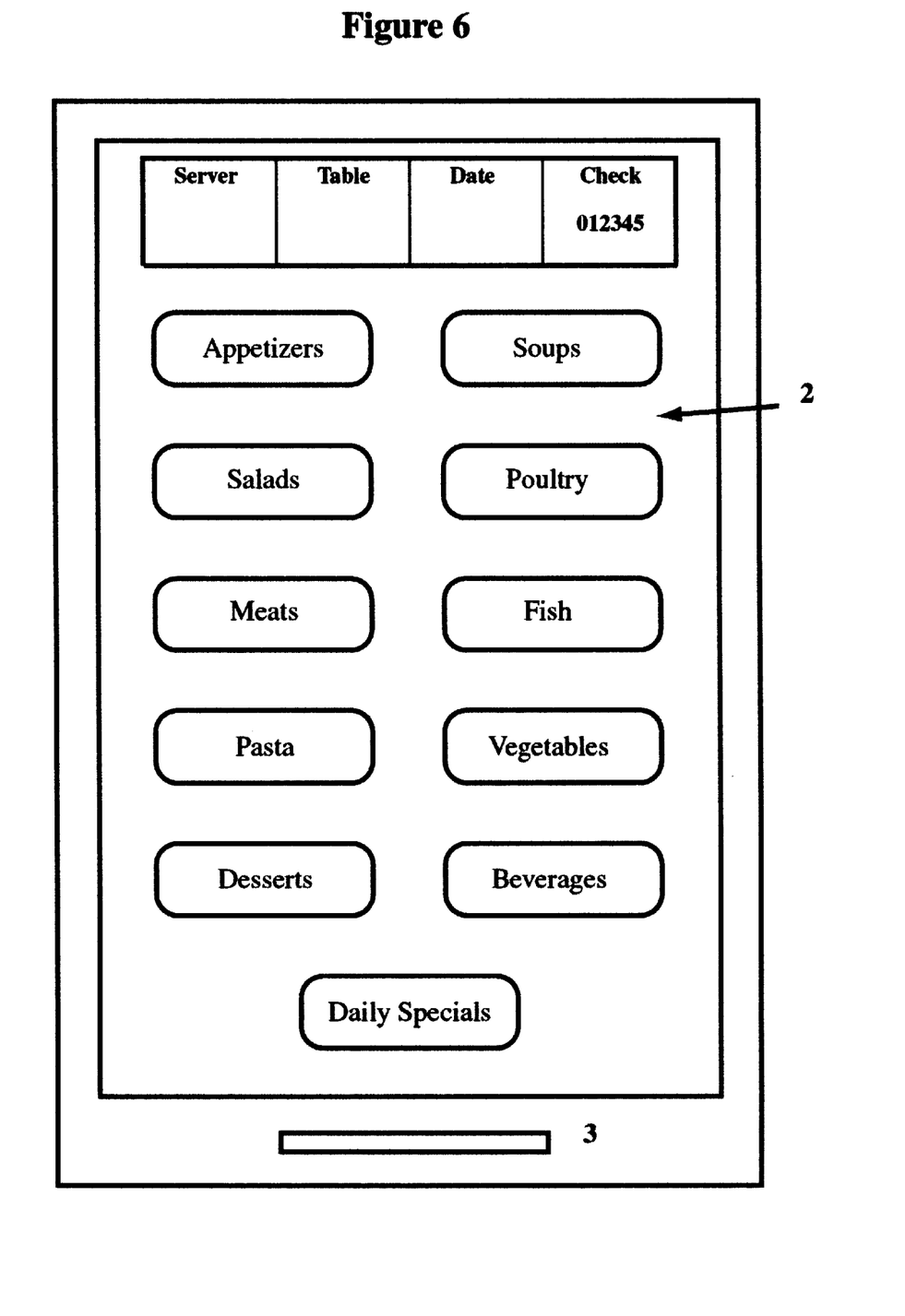
FIG. 6 is the image of the screen display of a pen computer under the control of a program to operate the pen computer to capture food and beverage orders.
Figure 7:
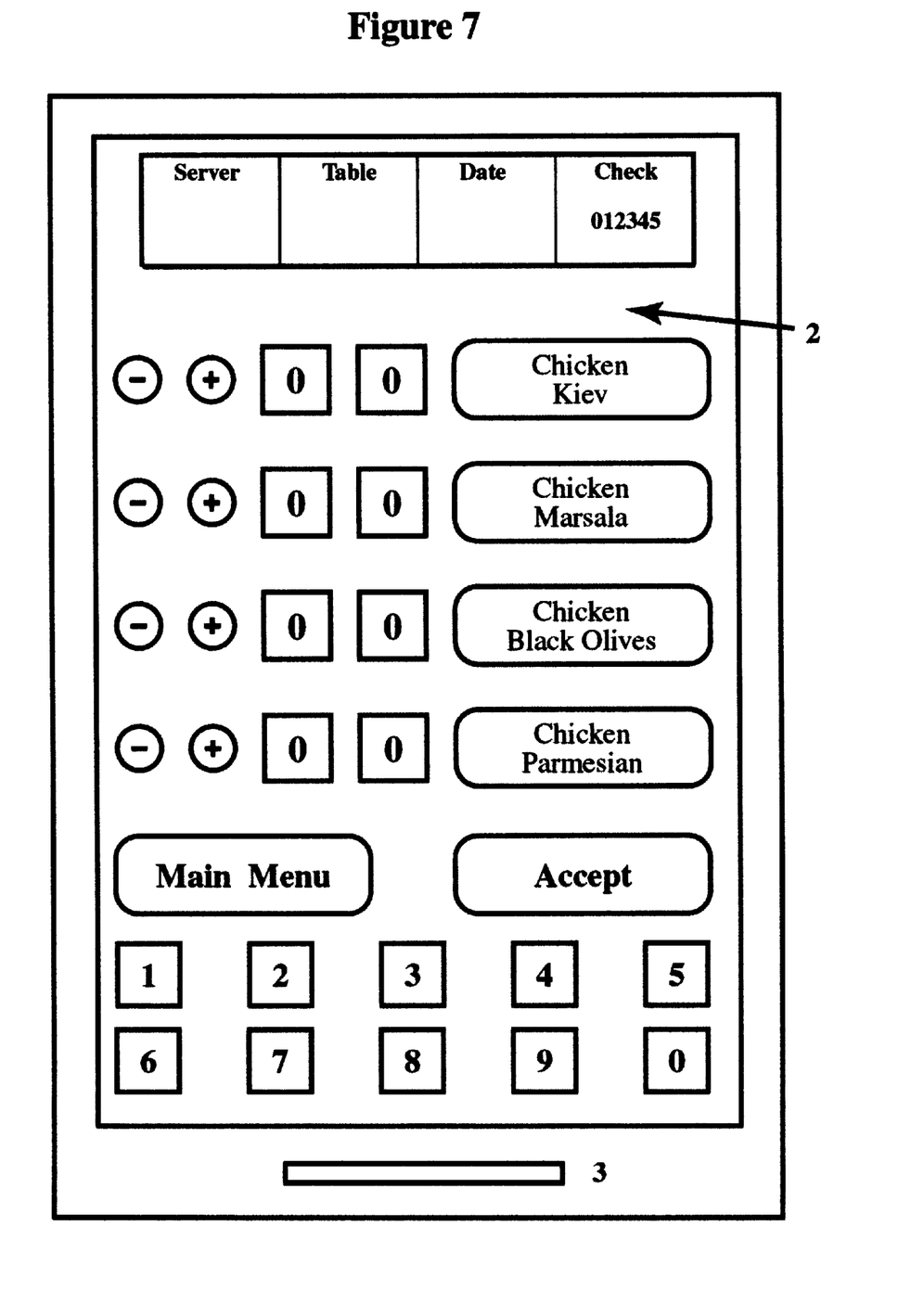

FIGS. 6 and 7 show how such an "Order Entry Program" operates. FIG. 6 shows the main order selection menu and FIG. 7 shows the "Poultry" sub menu. Those skilled in the art will understand that if a customer desires, say "Chicken Parmesan" the server will first use the stylus and touch the "Poultry" defined area as displayed in FIG. 6. This would then bring the "Poultry" sub menu as displayed in FIG. 7. Touching the defined area marked "+" associated with the "Chicken Parmesan" dish would increment the associated counter from 00 to 01. If the customer were to change his or her mid during the order taking process, the waiter would touch the defined area marked "−" associated with the "Chicken Parmesan" dish to decrement the associated counter. The use of hand held computers and computer terminals to expedite ordering food and beverages in restaurants is well understood. Those skilled in the art will understand that internal or external printing means, not shown, would print out the selections, thereby informing kitchen staff of the number and types of desired meals.

They will also understand that each item in Line_Items_Rows will have internally stored identification means to assign said item to the category "Food" or "Beverage."

(3) Set Food_Total to the sum of extended totals of each food item in Line_Items_Rows
  (4) Set Beverage_Total to the sum of extended totals of each beverage item in Line_Items_Rows
  (5) Set Meal_Total to Food_Total+Beverage_Total
  (6) Set Tax to Meal_Total X Sales_Tax_Rate
  (7) Set Sub_Total to Meal_Total+Tax
  (8) Set Grand_Total to Sub_Total
  (9) Set Dollar_Tip_Entry, Percentage_Tip_Entry, and Tip to 0

II. Asynchronous Process Phase: Each of the Following Events can Occur Independently
  (1) Detect stylus in screen area Percentage_Tip_Entry. Process numeric entry of gratuity as a percentage.
Evaluate Entry
  IF indecipherable or out of range,
    (i) Set Dollar_Tip_Entry, Percentage_Tip_Entry, Tip to 0
    (ii) Set Grand_Total to Sub_Total
    (iii) IDLE
  ELSE
    (iv) Set Tip and Dollar_Tip_Entry to (Percentage_Tip_Entry/100)×Meal_Total
    (v) Set Grand_Total to Sub_Total+Tip
    (vi) IDLE.
  (2) Detect stylus in screen area Dollar_Tip_Entry. Process entry of gratuity as an absolute dollar value.
Evaluate Entry
  IF indecipherable or out of range,
    (i) Set Dollar_Tip_Entry, Percentage_Tip_Entry, Tip to 0
    (ii) Set Grand_Total to Sub_Total
    (iii) IDLE
  ELSE
    (iv) Set Tip to Dollar_Tip_Entry
    (v) Set Percentage_Tip_Entry to (Tip/Meal_Total)×100
    (v) Set Grand_Total to Sub_Total+Tip
    (vi) IDLE
  (3) Pen signature at Signature_Area. Capture, display and store image of signature. Optionally, verify signature with a standard electronically recorded on the charge card.

III. Completion Phase
  (1) Detect charge card in charge card slot 3.
  IF Signature_Area blank
    (i) flash Signature_Area
    (ii) IDLE.
  ELSE
    (iii) Print a record of the charge transaction on printing means, either internal to pen computer or external, (neither shown). Optionally, transmit the digitally stored information regarding the completed transaction including the digital representation of the signature, to a central storage location, or store the information internally in the pen computer for later transmission.

Those skilled in the art will understand that the program described above which controls pen computer and displays pen computer screen is event driven. They will further recognize that the program and screen display can be created by the use of a general spreadsheet programming means. Those skilled in the art of computer programming will understand that the essence of the charging program just described consists of established logical and mathematical relationships among defined cells, which is, in fact, the characteristic nature of spreadsheets.

Pen numeric data entry as handwritten numerals may be characterized as "user friendly." However, handwriting recognition may require excessive computational power, may be too slow, or not desired for some other reason. Those skilled in the art will understand that a numeric keypad, such as that shown in FIG. 7, can be displayed on the screen to be used to input numeric values for the percent tip. With this technique it would not be necessary to recognize the patterns of unique handwriting, but only the x, y, screen coordinates of the stylus.

Those skilled in the art will comprehend that alternative program designs are possible, each one comprising, as two components, (A) means for inputting an optional gratuity as a percentage function rather than as an absolute monetary value and allowing the customer to immediately see the monetary value of the tip and as the other component, (B) means for allowing the customer to input the value of the tip as an absolute monetary value and to immediately see the percentage that the monetary value represents.

I claim:

1. An article of manufacture comprising a gratuity sheet to enable a customer in a restaurant or the like to record the value of an optional gratuity as a function of the cost of the meal; said gratuity sheet comprising a planar sheet having displayed thereon a first set of indicator means for defining a second set of indicator means for representing the gratuity as a percentage function.

2. In an article of manufacture comprising a restaurant check; the improvement comprising a first set of indicator means printed thereon for defining a second set of indicator means for representing the value of an optional gratuity as a percentage function.

3. An article of manufacture comprising a credit card slip used in restaurant or the like for the purpose of recording the cost of at least one meal and at least one optional gratuity, said credit card slip comprising (A) at least one planar sheet; and (B) a first set of indicator means printed thereon defining (C) a second set of indicator means for recording said optional gratuity as a percentage function.

4. In an article of manufacture comprising a credit slip used in a restaurant or the like for the purpose of recording the cost of at least one meal and at least one optional gratuity, said credit slip comprising (A) at least one planar surface and (B) indicators printed thereon the improvement comprising (C) a first set of indicators means printed thereon for defining (D) a second set of indicator means for recording said at least one optional gratuity as a percentage function.

5. In an article of manufacture comprising a pen computer used in a restaurant or the like to record the cost of at least one meal and at least one optional gratuity, said pen computer comprising (A) at least one planar surface defining a coextensive information receiving and information display surface; (B) means for internal digital storage of data and program instructions; (C) processor means to execute said instructions; (D) display means to display said internally stored data upon said planar surface; and (E) stylus detection means for recording the x, y position of a stylus relative to said planar information receiving surface;

the improvement comprising (F) means to input the value of said at least one gratuity as both a percentage function of the cost of the at least one meal and as an absolute monetary value; and (G) processing and display means to display upon said planar surface the value of the gratuity both (H) as a percentage and (I) as an absolute monetary amount.

6. In an article of manufacture comprising a pen computer used in a restaurant or the like to record the cost of at least one meal and at least one optional gratuity, said pen computer comprising (A) at least one planar surface defining a coextensive information receiving and information display surface; (B) means for internal digital storage of data and program instructions; (C) processor means to execute said instructions; (D) display means to display said internally stored data upon said planar surface; (E) stylus detection means for recording for internal storage the x, y position of a stylus relative to said planar surface; and (F) means to input the value of said at least one gratuity as an absolute monetary value:

the improvement comprising (G) display means to display the value of said at least one gratuity as both a percentage function of the cost of the at least one meal and as an absolute monetary value.

7. An article of manufacture used in a restaurant or the like to record at least one optional gratuity as a percentage function of the cost of at least one meal, where said article comprises; (A) at least one planar surface defining a coextensive information receiving and information display surface said surface having (B) at least one indicator means displayed thereon defining the amount of said gratuity as a percentage function, where said at least one indicator has been recorded on said planar surface by (C) stylus recording means.

8. An article according to claim 7 where the planar surface comprises paper and the stylus comprises a pen.

9. An article of manufacture according to claim 8 comprising a restaurant check.

10. An article of manufacture according to claim 8 comprising a credit card slip.

11. An article of manufacture according to claim 7 where the planar surface comprises the screen of a pen computer.

12. An article of manufacture according to claim 7 comprising a pen computer.

* * * * *